US011105911B2

(12) United States Patent
Heitzmann

(10) Patent No.: US 11,105,911 B2
(45) Date of Patent: Aug. 31, 2021

(54) METHOD AND SYSTEM FOR CONTEXTUALIZED PERCEPTION OF PHYSICAL BODIES

(71) Applicant: COMMISSARIAT A L'ENERGIE ATOMIQUE ET AUX ENERGIES ALTERNATIVES, Paris (FR)

(72) Inventor: Frédéric Heitzmann, Meylan (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 474 days.

(21) Appl. No.: 15/892,316

(22) Filed: Feb. 8, 2018

(65) Prior Publication Data

US 2018/0231650 A1 Aug. 16, 2018

(30) Foreign Application Priority Data

Feb. 16, 2017 (FR) ...................................... 1751246

(51) Int. Cl.
*G01S 13/04* (2006.01)
*G01S 13/86* (2006.01)
(Continued)

(52) U.S. Cl.
CPC .............. *G01S 13/04* (2013.01); *G01S 13/86* (2013.01); *G01S 13/931* (2013.01); *G06F 17/18* (2013.01);
(Continued)

(58) Field of Classification Search
CPC ............ G06K 9/00671; G06K 9/00805; G06F 17/18; G01S 13/04; G01S 13/86;
(Continued)

(56) References Cited

U.S. PATENT DOCUMENTS

| 2011/0006913 A1* | 1/2011 | Chen ...................... G08G 1/161 |
| | | 340/902 |
| 2014/0035775 A1 | 2/2014 | Zeng et al. |
| 2018/0203100 A1* | 7/2018 | McKitterick ......... G01S 7/4808 |

FOREIGN PATENT DOCUMENTS

| DE | 10 2009 007 395 A1 | 10/2009 |
| EP | 2 891 899 A1 | 7/2015 |

(Continued)

OTHER PUBLICATIONS

Hammond et al., Discretization Methods for Continuous Probability Distributions, Wiley Encyclopedia, 2015 (Year: 2015).*

(Continued)

*Primary Examiner* — Kyle R Quigley
(74) *Attorney, Agent, or Firm* — BakerHostetler

(57) ABSTRACT

A method for perceiving physical bodies comprises the following steps: a) acquisition of a plurality of distance measurements of the physical bodies arising from one or more sensors; b) acquisition or computation of a value of a priori probability of occupancy of the cells of an occupancy grid; and c) application of an inverse sensor model on the occupancy grid to determine a probability of occupancy of a set of cells of the grid; d) construction of a consolidated occupancy grid by fusing the occupancy probabilities estimated during step c); wherein each the inverse sensor model is a discrete model, associating with each cell of the corresponding occupancy grid, and for each distance measurement, a probability class chosen inside one and the same set of finite cardinality and identified by an integer index; and wherein step d) is implemented by means of integer computations performed on the indices of the probability classes determined during step c), and as a function of the value of (Continued)

a priori occupancy probability. A system for perceiving physical bodies, adapted to implement the method is provided.

21 Claims, 7 Drawing Sheets

(51) Int. Cl.
    *G06F 17/18*     (2006.01)
    *G01S 13/931*     (2020.01)
    *G06K 9/00*     (2006.01)

(52) U.S. Cl.
    CPC ..... *G06K 9/00671* (2013.01); *G06K 9/00805* (2013.01); *G01S 2013/9323* (2020.01); *G01S 2013/9324* (2020.01)

(58) Field of Classification Search
    CPC .......... G01S 13/931; G01S 2013/9323; G01S 2013/9324; G01S 17/89; G01S 7/4808
    See application file for complete search history.

(56) References Cited

FOREIGN PATENT DOCUMENTS

| | | |
|---|---|---|
| WO | 2007/028932 A1 | 3/2007 |
| WO | 2013/087067 A1 | 6/2013 |
| WO | 2017/050890 A1 | 3/2017 |

OTHER PUBLICATIONS

English translation of FR1751246 (Year: 2017).*
T. Rakotovao et al., "Multi-sensor fusion of occupancy grids based on integer arithmetic," 2016 IEEE International Conference on Robotics and Automation, May 16, 2016, pp. 1854-1859, XP032908400.
M. Yguel et al., "Efficient GPU-based Construction of Occupancy Grids Using Several Laser Range-finders," Intelligent 2006 IEEE International Conference on Robots and Systems, Oct. 1, 2006, pp. 105-110, XP031006221.
U. Scheunert et al., "Generalized Grid Framework for multi sensor data fusion," 2008 11th International Conference on Information Fusion, Jun. 30, 2008, pp. 1-7, XP031931930.
A. Elfes, "Occupancy grids: A stochastic spatial representation for active robot perception," Sixth Conference on Uncertainty in AI, 1990, pp. 136-146.
K. Konolige, "Improved occupancy grids for map building," Autonomous Robots, vol. 4, 197, pp. 351-367.
J. Adarve et al., "Computing occupancy grids from multiple sensors using linear opinion pools," Proceedings IEEE International Conference on Robotics and Automation, 2012.
T. Rakotovao et al., "Real-time power-efficient integration of multi-sensor occupancy grid on many core," 2015 International Workshop on Advanced Robotics and its Social Impact, Jun. 30, 2015.
E. Kaufman et al., "Bayesian Occupancy Grid Mapping via an Exact Inverse Sensor Model," 2016 American Control Conference (ACC), Jul. 6-8, 2016, pp. 5709-5715.

* cited by examiner

METHOD AND SYSTEM FOR CONTEXTUALIZED PERCEPTION OF PHYSICAL BODIES

CROSS-REFERENCE TO RELATED APPLICATIONS

This application claims priority to foreign French patent application No. FR 1751246, filed on Feb. 16, 2017, the disclosure of which is incorporated by reference in its entirety.

FIELD OF THE INVENTION

The invention pertains to a method and a system for perceiving and estimating the position of physical bodies carrying out, in a manner which is efficient in terms of computational power and energy consumption, a multi-sensor fusion.

By "physical body" is meant any physical object or substance that exhibits individuality and can be detected and identified by an appropriate sensor. Thus, inanimate objects, be they natural or artificial, plants, animals, human beings, but also liquid or solid particles in suspension in the air, such as clouds, or indeed liquid or gaseous masses, are considered to be physical bodies.

The invention applies especially to the field of the navigation of robots, drones, autonomous vehicles, etc. and more generally to that of perception.

BACKGROUND

With the explosion of computation means that can be integrated into a robot, robotics applications have multiplied in recent years, from industrial production to home automation, from space and underwater exploration to mass-market toy drones. The tasks carried out in robotic applications have become progressively more complicated, ever more often requiring robots to be able to move around in unknown environments; this has made it ever more important to develop means and techniques of perception, that is to say that allow the discovery and interpretation of surrounding space. An important application which uses perception in robotics is navigation, which consists in fixing a destination objective for a robot, and leaving it to arrive thereat while taking care to avoid unknown and potentially mobile obstacles; the robot is then in charge of planning its trajectory itself. A typical example, forming the subject of intense research, is the autonomous car.

To allow knowledge of the whole environment while limiting to the maximum the dead angles, and to alleviate any possible defect of a sensor, one generally has recourse to the integration of multiple sensors. When several sensors, possibly of different types, cover the same space, it is necessary to be able to combine the information extracted from each of them: one then speaks of multi-sensor fusion.

There exist two main families of perception techniques: geometric procedures, which are aimed at identifying the geometry of the objects of the surrounding space, and occupancy grid based procedures, which are aimed at determining whether a certain location is occupied by an obstacle (more generally, by a physical body). The invention pertains to occupancy grid based techniques.

The theoretical foundations of multi-sensor perception and fusion procedures based on occupancy grids are described in the article by A. Elfes, "Occupancy grids: a stochastic spatial representation for active robot perception" (Sixth Conference on Uncertainty in AI, 1990). This publication is not concerned with the practical implementation of the procedures, direct application of which would require complex floating-point computations.

The article by K. Konolige "Improved occupancy grids for map building" (Autonomous Robots, 4, 351-367, 1997), that by J. Adarve et al. "Computing occupancy grids from multiple sensors using linear opinion pools", (Proceedings—IEEE International Conference on Robotics and Automation, 2012) and that by T. Rakotovao et al. "Real-time power-efficient integration of multi-sensor occupancy grid on many core" (2015 International Workshop on Advanced Robotics and its Social Impact, 30 Jun. 2015) and that by E. Kaufman et al. "Bayesian Occupancy Grid Mapping via an Exact Inverse Sensor Model" (2016 American Control Conference-ACC, Boston Mariott Copley Place, 6-8 Jul. 2016, Boston, pp. 5709-5716) describe enhancements of the techniques based on occupancy grids. Here again, the implementation of these techniques requires massive recourse to floating-point computation.

Documents US 2014/035775, FR 2006/050860 and DE 102009007395 describe multi-sensor perception and fusion procedures and systems based on occupancy grids, applied to the autonomous driving of terrestrial vehicles. All these procedures require, for their implementation, floating-point computations.

However, recourse to floating-point computation demands considerable resources in terms of computational power, which are hardly compatible with the constraints specific to the embedded systems. For the record, the floating-point format—defined by the IEEE standard 754—represents a number by means of three elements: a sign (1 bit), a mantissa (23 or 52 bits) and an exponent (8 or 11 bits). Performing computations using numbers represented in floating point is much more complex (that is to say requires many more elementary operations) than performing computations on integers. This therefore requires the use of a faster processor and/or of a dedicated hardware accelerator, with an unfavorable impact in terms of cost, bulkiness and electrical consumption.

The article by T. Rakotovao et al. "Multi-Sensor Fusion of Occupancy Grids based on Integer Arithmetic" (2016 IEEE International Conference on Robotics and Automation—ICRA, Stockholm, 16-21 May 2016, pp. 1854-1859) describes a multi-sensor perception and fusion method based on an occupancy grid, using only computations on integers, but without introducing errors with respect to the approaches having recourse to floating-point computations. Such a method is also described in the patent application in France 15-58919 of 22 Sep. 2015 and in the international application PCT/EP2016/072530 of 22 Sep. 2016. This approach allows the use of simple embedded computation devices, not necessarily supporting floating-point operations; even in the case where floating-point computations would be supported, it makes it possible to reduce the energy consumption of the computation device, by avoiding or greatly limiting the actual recourse to such computations.

Document WO 2013/087067 discloses the use of a position item of information received from outside, by radio, to determine whether certain cells of an occupancy grid can be considered free or occupied. The item of information received is of binary type and does not quantify an occupancy probability.

The invention is aimed at affording an enhancement to this procedure, and more particularly at increasing the relevance of the occupancy grid computed with the aid of the measurements of the sensors, without increasing the complexity of the computations performed in real time.

In accordance with the invention, this aim is achieved by rendering the computation of the occupancy probabilities dependent on an a priori probability the value of which is context-dependent. For example, in the case of an application to autonomous or assisted driving, the a priori probability (that is to say before any measurement) that obstacles are present in proximity to a vehicle is higher or lower as a function of the traffic flow density.

On the other hand, the procedure described in the aforementioned article by T. Rakotovao et al. uses a fixed a priori occupancy probability equal to 0.5, thus conveying total ignorance of the context. The generalization in the case of an arbitrary a posteriori probability, which therefore can change as a function of the context, is not obvious. The inventors have succeeded in performing such a generalization, and in noting that it does not involve an increase in the complexity of the computations that have to be performed in real time.

The value of the context-dependent a priori occupancy probability can be determined in several different ways. For example:
- It can be chosen manually by a user, for example the driver—or passenger—of a vehicle.
- It can be transmitted to an embedded computation device by a control station, for example a road traffic monitoring center.
- It can be computed as a function of the position and/or of the time. For example, still considering the case of an application to assisted or autonomous driving, the a priori occupancy probability may be higher in the morning and at the end of the afternoon than in the middle of the day or at night; likewise, it will be reasonably higher in a built-up urban area than in a rural zone.
- It can also be computed on the basis of measurements obtained from a dedicated sensor. For example, this may be a non-directional radar, which detects the presence of obstacles without locating them precisely.

SUMMARY OF THE INVENTION

A subject of the invention is therefore a method for perceiving physical bodies comprising the following steps, implemented by a computer or a dedicated digital electronic circuit:
a) Acquisition of a plurality of distance measurements of said physical bodies arising from one or more sensors;
b) Acquisition from an outside device, or computation on the basis of at least one signal received from outside, of at least one value of a priori probability of occupancy of the cells of an occupancy grid;
c) Application, to each said distance measurement, of an inverse model of the corresponding sensor on said occupancy grid providing a discretized spatial representation of an environment of said sensor, so as to determine a probability of occupancy by a physical body of a set of cells of said occupancy grid, each said inverse sensor model being a discrete model, associating with each cell of the corresponding occupancy grid, and for each distance measurement, a probability class chosen inside one and the same set of finite cardinality, each said probability class being identified by an integer index; and
d) Construction of a consolidated occupancy grid each cell of which exhibits an occupancy probability computed by fusing the occupancy probabilities estimated during step c), the probability of occupancy of each cell of the consolidated occupancy grid being determined by means of integer computations performed on the indices of the probability classes determined during said step c), and as a function of said or of a said a priori occupancy probability.

Another subject of the invention is a system for perceiving physical bodies comprising:
- at least one first input port for receiving a plurality of signals representative of distance measurements of said physical bodies arising from one or more sensors;
- at least one second input port for receiving a signal representative of at least one value of a priori probability of occupancy of the cells of an occupancy grid, or allowing its computation;
- a data processing module configured to receive as input said signals and to use them to construct a consolidated occupancy grid by applying a method such as stated hereinabove; and
- at least one output port for a signal representative of said consolidated occupancy grid.

BRIEF DESCRIPTION OF THE DRAWINGS

Other characteristics, details and advantages of the invention will emerge on reading the description given with reference to the appended drawings, which drawings are given by way of example and illustrate respectively.

DETAILED DESCRIPTION

In the detailed description which follows, reference will be made to the case of the perception of obstacles. However, everything that is described applies more generally to the perception of physical bodies of any sort.

Usually, sensors employed for navigation advise regarding the distance of surrounding obstacles; one then speaks of distance sensors. To account for the precision of a sensor, for possible error thereof or for its resolution, a probabilistic model is introduced. The idea is that a measurement output by the sensor does not necessarily indicate the exact distance between the obstacle and the sensor, and that consequently it is appropriate to reason regarding the probability that the obstacle is at a given distance knowing the response of the sensor.

Figure 1:
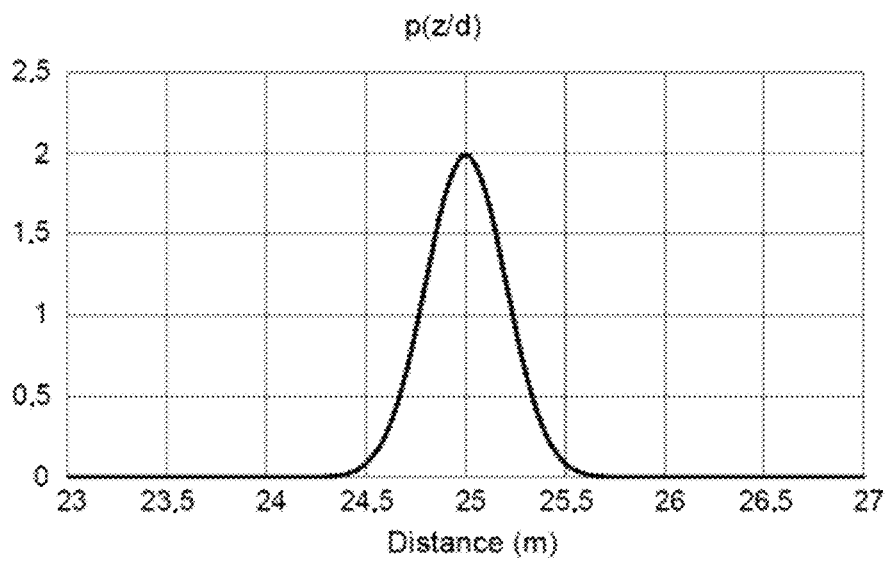
FIG. 1, the notion of "direct" model of a distance sensor.

If D denotes the real distance between an obstacle and the sensor, and z the output of the sensor, one is concerned with the conditional probability density function $p(z|D)$ which models the relationship between the real position of an obstacle and its estimation seen by the sensor ("direct model"). FIG. 1 presents an exemplary direct model of a sensor; a linear space 50 m long is considered and it is assumed that an obstacle is situated at d=25 m from the sensor. For a sensor with an error modelable by a Gaussian function, the most probable response z will be close to 25 m, but other values will be possible, with a probability density defined by the curve. In the case of an ideal sensor, we would have p(z|D)=δ(z−D), where δ is a Dirac Delta, and the measurement would always be equal to the true distance. The direct model of a sensor can be determined in an experimental manner, by performing series of measurements for one or more distances D. It can also be constructed in an empirical manner, typically on the basis of data provided by the constructor (in the Gaussian case, the value of the standard deviation suffices to characterize the model).

Figure 2:
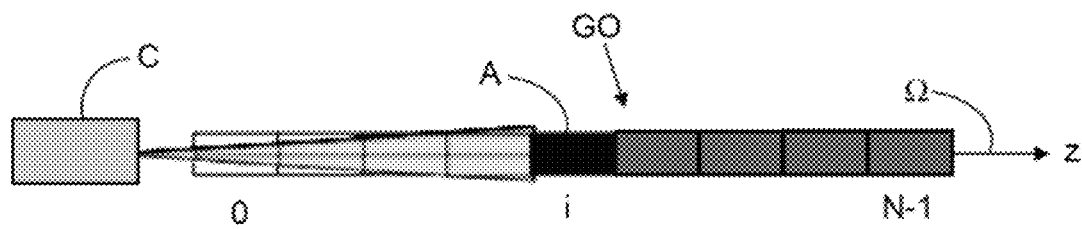
FIG. 2, the notion of occupancy grid.

Hereinafter, Ω will denote a spatial benchmark with one, two or three dimensions; an occupancy grid GO is a partition of a continuous and bounded subset of Ω into a number N of parts, dubbed cells and designated by an index i∈G[0, N−1]. The cell of index i is indicated by $c_i$. Without loss of generality, we shall consider hereinafter a one-dimensional occupancy grid observed by a single distance sensor C (or a plurality of co-located sensors), the index i increasing as the sensor gets further away ($c_0$ therefore being the cell closest to the sensor and $c_{N-1}$ the one furthest away). This configuration is illustrated by FIG. 2.

An obstacle A is a bounded continuous subset of Ω. A cell $c_i$ is said to be occupied by an obstacle A if A∩$c_i$≠∅, to be not occupied by A∩$c_i$=∅. Stated otherwise, if the obstacle covers the cell even partially, the latter is considered to be occupied. Other conventions are possible, but in any event a cell must be either free, or occupied.

For each of the cells of the grid, we consider the binary random experiment "state" which can have one of the two outcomes {occupied; vacant} consisting in knowing whether or not the cell contains an obstacle. The state of the cell $c_i$ will be denoted $e_i$, $o_i$ will denote the realization $e_i$=occupied and $v_i$ will denote the realization $e_i$=vacant. In a grid, it is considered that all the cells are independent, so that $$\forall i,j \in [0,N-1], P(o_i \wedge o_j) = P(o_i) \cdot P(o_j) \quad (1)$$

where ∧ is the logical operator "and" and P(.) denotes the probability of an event (not to be confused with a probability density, designated by a lower case "p"). Hereinafter, for the sake of simplicity, we shall replace "∧" by a comma, thus $P(o_i, o_j) \equiv P(o_i \wedge o_j)$.

It is also considered that the position of the obstacles can only be known with the aid of uncertain distance sensors, characterized by a probabilistic model such as described above which may be written in a more general manner p(z|$\vec{x}$), $\vec{x}$ being the position of an obstacle (in several dimensions, it is a vector, expressed in cartesian, spherical, polar coordinates, etc. and not a simple scalar). These sensors may be telemetric lasers (also called lidars), sonars, infrared radars, flight-time cameras, etc.

A measurement z arising from a sensor makes it possible to determine the probability of occupancy P($o_i$|z) of a cell $c_i$. For a given measurement z, the set of probabilities P($o_i$|z) ∀i∈[0, N−1] constitutes the inverse model of the sensor on the grid. Whilst the direct model of the sensor advises regarding the response of the sensor as a function of the physical world, the inverse model expresses the impact of the measurement on the occupancy grid which is the model of the physical world that is adopted, thereby justifying the term inverse model.

Figure 3:
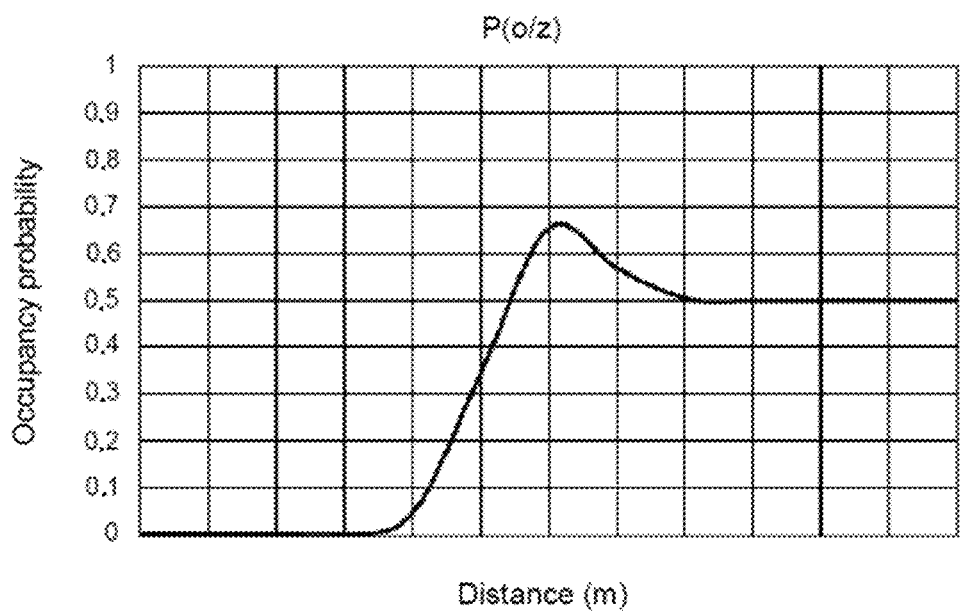
FIG. 3, the notion of "inverse" model of a distance sensor.

FIG. 3 presents a typical example of inverse model of a distance sensor, in a case where z=25 m. It may be verified that the probability of occupancy is quasi-zero for the cells which are situated a distance of less than 24.25 m from the sensor and attains a peak for a distance of 25 m (corresponding to the measurement provided by the sensor). Beyond 25 m, the occupancy probability decreases until it stabilizes at a value of 0.5, indicative of a total ignorance of the occupancy state of the cells which, being situated beyond the obstacle, are masked by the latter and therefore inaccessible to the sensor.

In accordance with the usage which prevails in the literature, FIG. 3 represents the inverse model by means of a smoothed curve. A more correct representation would be to display only the points corresponding to the limits of the cells of the grid: indeed, it is not possible to distinguish a "partially" occupied cell from another which would be "totally" occupied, in all cases the distance to the obstacle will be estimated as being the distance to the corresponding cell. This is the spatial error introduced by the grid.

Figure 4:
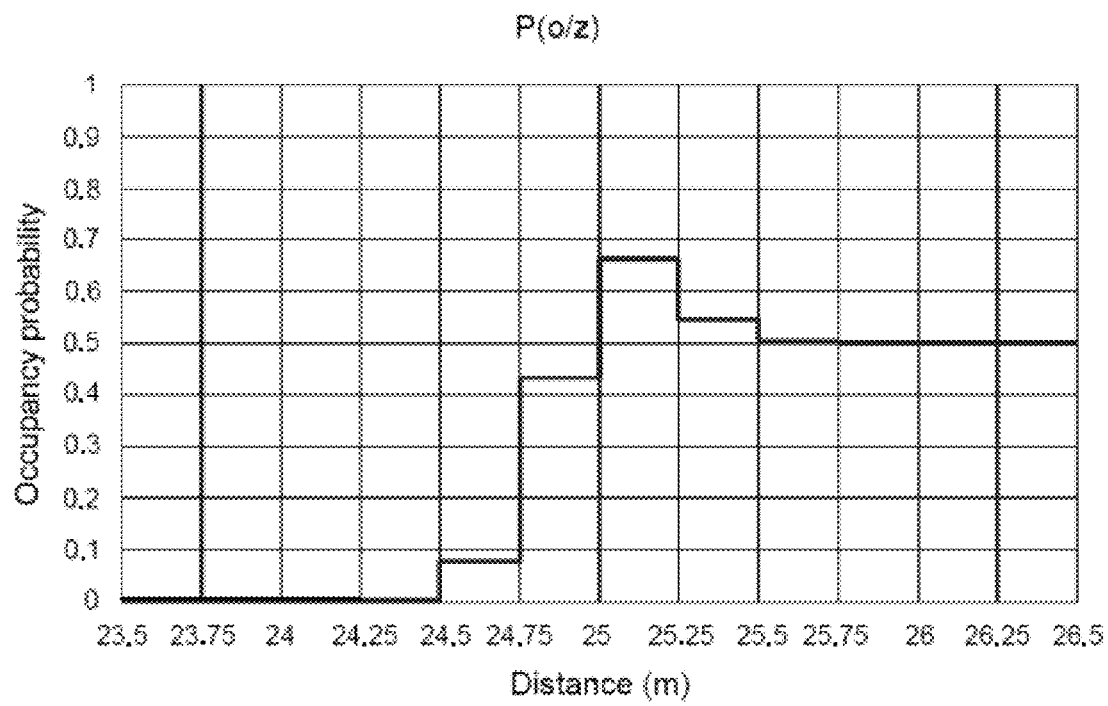
FIG. 4, the spatial discretization of an inverse model on an occupancy grid.
Figure 5A:
FIGS. 5A to 5D, a procedure for choosing the optimal spatial resolution of an occupancy grid.
Figure 5B:
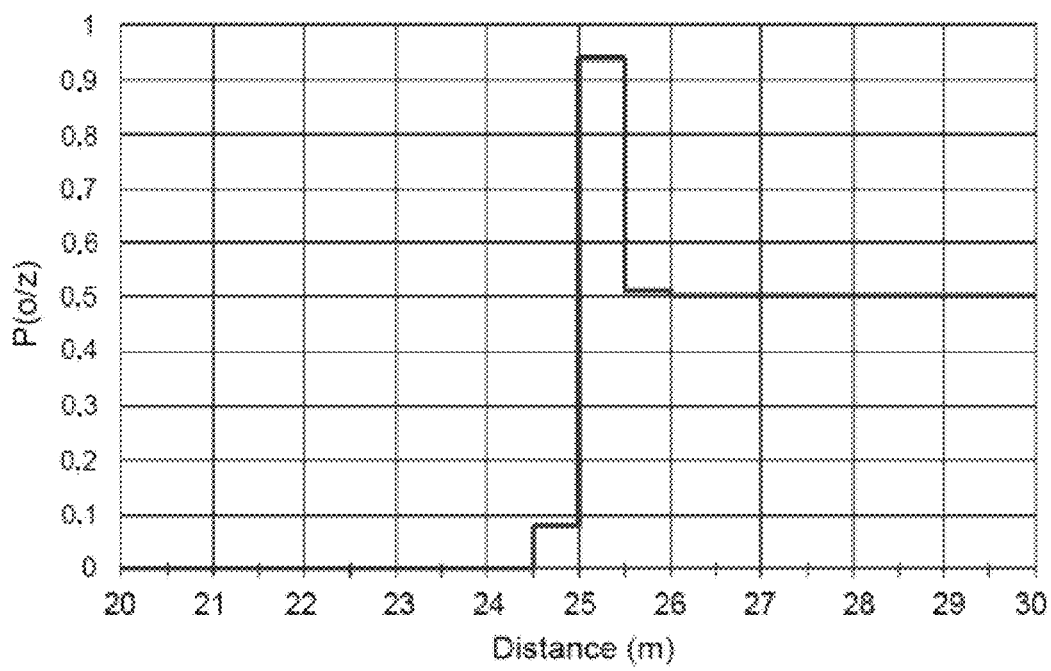
Figure 5C:
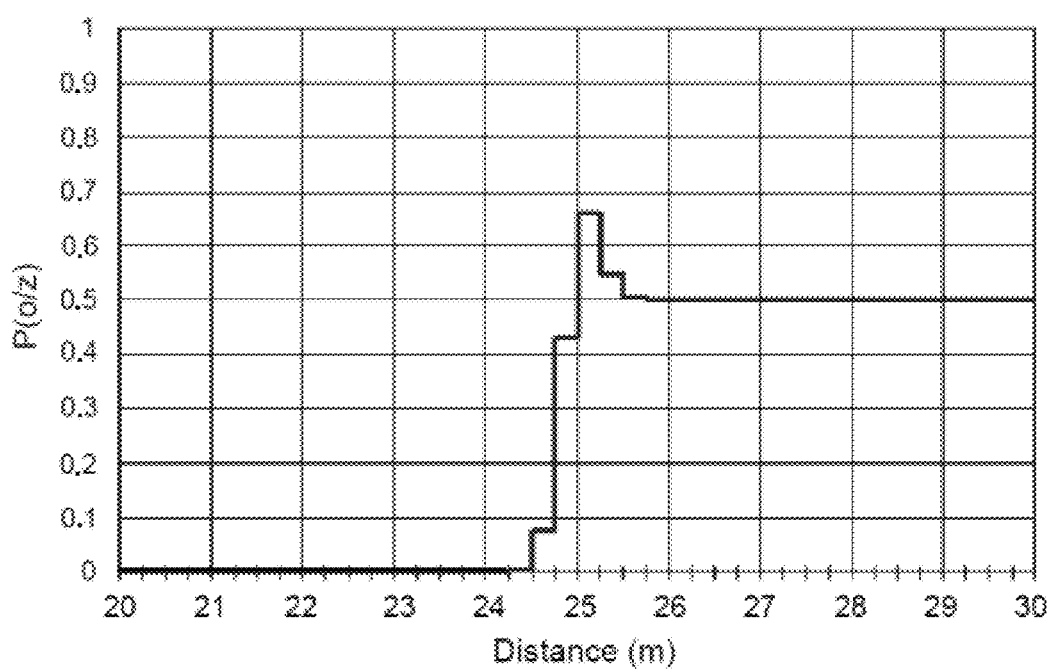
Figure 5D:
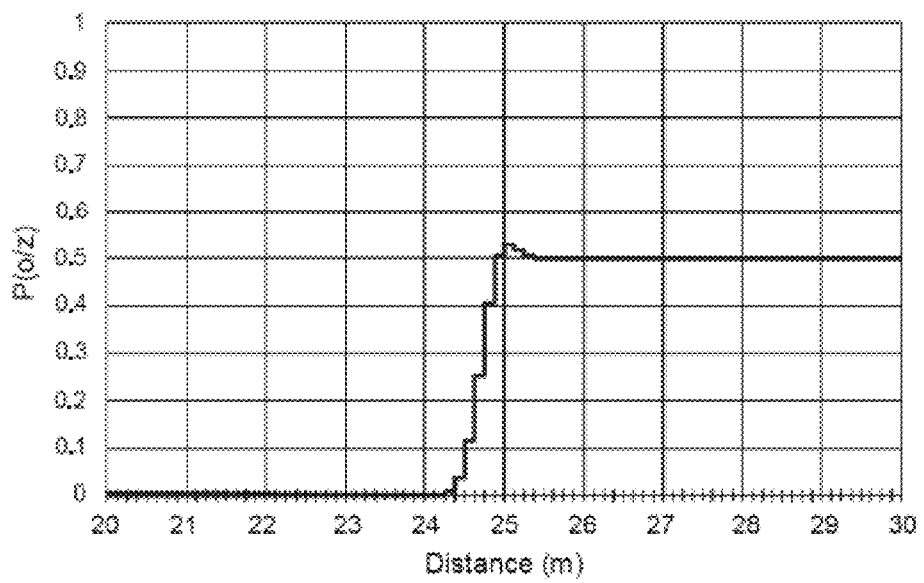

A more apposite version of the inverse model of FIG. 3, taking account of this spatial discretization induced by the grid is presented in FIG. 4.

It should be stressed that the notions of "occupancy" and of "obstacle distance" are not entirely equivalent. Indeed, saying that an obstacle is at a sensor distance z does not signify only that a certain cell is occupied, but also that all the other cells of the grid that are closer to the sensor are free (otherwise, the first obstacle would have been seen at a distance of less than z). In the aforementioned FIG. 2, the obstacle A is situated in the cell of index i (black); the cells of index less than i are represented as white to indicate that they are free, those of index greater than i are represented as grey to indicate that their occupancy state is unknown.

If the notion of uncertain sensor characterized by its (direct) model p(z|$\vec{x}$) is taken into account and if $d_i$ denotes the distance of the cell $c_i$ with respect to the measurement point and $\vec{x}_l$ denotes the closest point of the cell $c_i$ to the said measurement point, we have:

$$\forall i < N, p(z|\vec{x}_i) = p(z|v_0, \ldots, v_{i-1}, o_i) \quad (2)$$

Equation (2) indicates that the model of the sensor evaluated at a point which is on the boundary of a cell of the grid ($x_i$) is equal to the probability density of response of the sensor for a corresponding grid configuration, namely a grid where the cells closer than cell i are vacant, cell i is occupied, and the occupancy states of the cells further away than cell i are not determined. The inverse model of the sensor can be constructed by utilizing this item of information. An explanation of this method is given hereinbelow.

Bayes' theorem makes it possible to express the inverse model of a sensor P($o_i$|z) in the following manner:

$$P(O_i | Z) = \frac{p(Z | O_i) P(o_i)}{p(z)} = \frac{p(Z | O_i) P(o_i)}{p(Z | O_i) P(o_i) + p(Z | V_i) P(v_i)}. \quad (3)$$

where P($o_i$) and P($v_i$) designate the a priori probabilities (that is to say without knowing the position of the obstacles, or the output of the sensor) that the cell ci is occupied or free, respectively. Hereinafter, we will make the assumption of equal a priori probabilities for all the cells: P($o_i$)=P(o) and P($v_i$)=P(v)=1−P(o) ∀i. This assumption makes it possible to simplify the computation of the inverse model, but is in no way essential. The inverse model remains calculable if P($o_i$) is not constant, provided that the a priori occupancy probability of each cell is known. The computations are admittedly more complex, but need only be performed once, and not in real time; the complexity is therefore not crippling.

Equation (3) then becomes:

$$P(O_i \mid Z) = \frac{p(Z \mid O_i)P(o)}{p(Z \mid O_i)P(o) + p(Z \mid V_i)[1 - P(o)]} \quad (4)$$

To be able to apply equation (4) and actually determine $P(o_i|z)$, the terms $p(z|o_i)$ and $p(z|v_i)$ must be computed beforehand. Accordingly, the case of a one-dimensional grid will be considered, but generalization is not difficult. In the case where the a priori occupancy probability is not the same for all the cells, equation (4) can be generalized without difficulty:

$$P(O_i \mid Z) = \frac{p(Z \mid O_i)P(o_i)}{p(Z \mid O_i)P(o_i) + p(Z \mid V_i)[1 - P(o_i)]} \quad (4\text{bis})$$

Computation of $p(z|o_i)$

Let "d" be the first occupied cell of the grid ($0 \le d < N$), and $P(d_k)$ the probability of the event $d=k$. We can then write:

$$p(z|o_i) = \Sigma_{k=0}^{N-1} p(z|d_k)P(d_k o_i) + p(z|V)P(V|o_i) \quad (5)$$

where V corresponds to the event "all the cells are vacant". By definition $P(d_k|o_i)=0$ if $k>i$ and $P(V|o_i)=0$, therefore:

$$p(z|o_i) = \Sigma_{k=0}^{i} p(z|d_k)P(d_k|o_i) \quad (6)$$

The term $P(d_k|o_i)$ takes the following values, as a function of the indices k and i:

$$\begin{cases} P(d_0 \mid o_0) = 1 \\ P(d_0 \mid o_i) = P(o_0) \text{ for } i > 0 \\ P(d_k \mid o_i) = [\Pi_{j=0}^{k-1} P(v_j)]P(o_k) \text{ for } 0 < k < i \\ P(d_i \mid o_i) = \Pi_{j=0}^{i-1} P(v_j) \\ P(d_k \mid o_i) = 0 \text{ for } k > i \end{cases} \quad (7)$$

At this point, the aforementioned assumption of equal a priori probabilities for all the cells is introduced:

$$P(o_i)=P(o) \text{ and } P(v_i)=P(v)=1-P(o) \forall_i. \quad (8)$$

By substituting (7) and (8) into (6) we find:

$$\begin{cases} p(z \mid o_0) = p(z \mid d_0) \\ p(z \mid o_i) = P(o)p(z \mid d_0) + \Sigma_{k=0}^{i}[1 - P(o)]^k P(o)p(z \mid d_k) + [1 - P(o)]^i p(z \mid d_i): i > 0 \end{cases}$$

Computation of $p(z|v_i)$

In a similar manner to (6) we can write:

$$p(z|v_i) = \Sigma_{k=0}^{N-1} p(z|d_k)P(d_k|v_i) + (z|V)P(V|v_i) \quad (10)$$

but in (10) the second term is generally not zero.

The term $P(d_k|v_i)$ takes the following values, as a function of the indices k and i:

$$\begin{cases} P(d_0 \mid v_0) = 0 \\ P(d_0 \mid v_i) = P(o_0) \text{ for } i > 0 \\ P(d_k \mid v_i) = [\Pi_{j=0}^{k-1} P(v_j)]P(o_k) \text{ for } 0 < k < i \\ P(d_i \mid v_i) = 0 \\ P(d_k \mid v_i) = [\Pi_{j=0}^{i-1} P(v_j)] \cdot [\Pi_{j=i+1}^{k-1} P(v_j)] \cdot P(o_k) \text{ for } k > i \end{cases} \quad (11)$$

By substituting (11) into (10) and by introducing the aforementioned assumption of equal a priori probabilities for all the cells:

$$P(o_i)=P(o) \text{ and } P(v_i)=P(v)=1-P(o) \forall i. \quad (8)$$

we find:

$$\begin{cases} p(z \mid v_0) = P(o)p(z \mid d_1) + \Sigma_{k=2}^{N-1}[1 - P(o)]^k P(o)p(z \mid d_k) + \\ \qquad + [1 - P(o)]^{N-1} p(z \mid V) \\ p(z \mid e_i) = P(o)p(z \mid d_0) + \Sigma_{k=0}^{i}[1 - P(o)]^k P(o)p(z \mid d_k) + \\ \qquad + \Sigma_{k=i+1}^{N-1}[1 - P(o)]^{k-1} P(o)p(z \mid d_k) + [1 - P(o)]^{N-1} p(z \mid V) \end{cases} \quad (12)$$

To obtain the inverse model, it therefore suffices to substitute (8), (9) and (12) into (4).

The construction of the inverse model depends greatly on the definition of the grid. It is therefore interesting to study the impact of a variation of spatial resolution on the inverse model. FIGS. 5A-5D show the inverse models of one and the same sensor on four different spatial resolution grids: 1 m (6A), 50 cm (6B), 25 cm (6C), 12.5 cm (5D). These inverse models have been constructed by taking $P(o)=P(v)=0.5$. It may be noted that as the resolution increases (the spacing of the grid decreases), the maximum of the inverse model decreases and tends to 0.5. Indeed, one should not expect to be able to know the position of an obstacle with a higher precision than that of the sensor. On the contrary, if one is content to know the occupancy with a much lower precision than that of the sensor, then the presence or absence of an obstacle can be determined with great certainty (case of FIG. 5A, where the maximum of the inverse model equals 0.999994). These considerations make it possible to optimize the spatial resolution of the grid: it is indeed possible to carry out an exploration making it possible to determine the maximum resolution of the grid for which the maximum of the inverse model remains greater than a threshold (strictly greater than 0.5 and strictly less than 1) considered to be "significant".

On the basis of the inverse models of two sensors on one and the same occupancy grid, the fusion of the data of the two sensors is performed with the aid of the following equation:

$$P(o_i \mid z_1, z_2) = \frac{[1 - P(o)]P(o_i \mid z_1)P(o_i \mid z_2)}{[1 - P(o)]P(o_i \mid z_1)P(o_i \mid z_2) + P(o)P(v_i \mid z_1)P(v_i \mid z_2)} \quad (13)$$

where $z_1$ and $z_2$ are the measurements provided by the two sensors (the generalization to more than two sensors is immediate—it suffices to consider $P(o_i|z_1,z_2)$ as the inverse model of a "virtual" sensor and to fuse it with the measurement provided by a third sensor, and so on and so forth).

In the case where the a priori occupancy probability is not the same for all the cells, equation (13) can be generalized without difficulty:

$$P(o_i \mid z_1, z_2) = \qquad (13\text{bis})$$
$$\frac{[1 - P(o_i)]P(o_i \mid z_1)P(o_i \mid z_2)}{[1 - P(o_i)]P(o_i \mid z_1)P(o_i \mid z_2) + P(o_i)P(v_i \mid z_1)P(v_i \mid z_2)}$$

Applying equation (13) or (13bis) directly to the fusion of data arising from several sensors is difficult to envisage in an embedded system, since this would require the execution of numerous floating-point computations for each cell of the grid at a frequency at least as fast as the acquisition frequency of the sensors. Considerable computational power would therefore be required.

In accordance with the approach already disclosed by the aforementioned article by T. Rakotovao et al., the invention utilizes the notion of "probability classes" to perform the fusion of the data of several sensors while using only integer computations.

In what follows, a countable subset of [0; 1], whose elements $p_n$ can therefore be characterized by a relative integer index "n", will be called a "system of probability classes" $S = \{p_n, n \in \mathbb{Z}\}$. If the data fusion function expressed by equation (13) hereinabove is called "F", we can write:

$$F(p_1, p_2) = \frac{[1 - P(o)] \cdot p_1 \cdot p_2}{P(o) \cdot p_1 \cdot p_2 + P(o) \cdot (1 - p_1) \cdot (1 - p_2)} \qquad (14)$$

In the case where the a priori occupancy probability is not the same for all the cells, equation (14) can be generalized without difficulty:

$$F(p_1, p_2) = \frac{[1 - P(o_i)] \cdot p_1 \cdot p_2}{P(o_i) \cdot p_1 \cdot p_2 + P(o_i) \cdot (1 - p_1) \cdot (1 - p_2)} \qquad (14\text{bis})$$

A particularly interesting case is that of a system of classes such that the result of the fusion of two probability classes of the system also belongs to the system; formally: $\forall p_i, p_j \in S$, $F(p_1, p_2) \in S$. One then speaks of an "error-free" system of classes, since the fusion does not introduce any error or approximation. It is therefore possible to label the probability values by the indices of the corresponding classes, and the result of a fusion is also identified by an index. The fusion problem then amounts to determining an appropriate function $F_d$ which, with two integer indices, associates another integer index. Formally:

$$\forall (k,l) \in \mathbb{Z}^2, \exists i \in \mathbb{Z} : F(p_k, p_l) = p_i$$

and we write $F_d(k,l) = i$.

The computation of $F_d(k,l)$ requires only the knowledge of the indices k and l and of integer index arithmetic; no floating-point computation is necessary for computing the fusion of the information $p_k$ and $p_l$. Moreover, if the system of classes is considered to be error-free, the index obtained with the aid of $F_d(k,l)$ designates a probability value that is strictly identical to that obtained—using floating-point numbers—by applying equation (14). The procedure thus allows the fusion of the probability classes free of error with respect to a floating computation.

A trivial example of an error-free system is $S = \{\frac{1}{2}, 1\}$. Any error-free system of classes comprising probabilities different from $\frac{1}{2}$, 1 and 0 necessarily comprises an infinity of elements. In practice, for obvious implementational reasons, only systems of probability classes of finite cardinality will be considered. However, given that the sensors are finite in number and that their outputs (quantized and digitized) can take only a finite number of values, it is proven that it is possible to carry out "error-free" fusions even on the basis of systems of probability classes of finite cardinality.

It is important to note that the inverse model of FIG. 4 was discretized spatially, but the probability of occupancy of each cell was able to take any value included in the interval [0,1]. The use of systems of classes also involves a discretization of the probability values. Thus, it is necessary to approximate the probability values of the inverse model of FIG. 4 by elements of a system of classes S.

A first possibility consists in replacing the values of the inverse model with the closest elements of S, so as to minimize the quantization error. This approach can lead to under-estimating the probability of occupancy of a cell, which might not be acceptable in an obstacle detection application. An alternative consists in approximating the values of the theoretical inverse model by the smallest upper bound of the system of classes S; thus the occupancy probability is never under-estimated, which may be an advantage for the detection of obstacles. In other applications, such as people counting, this type of approximation may on the other hand lead to the generation of false-positives.

Whatever the type of approximation considered, the spatially discretized inverse system takes a very small number of values (from less than 10 to a few tens at most). Consequently, the number of elements of the system S which are required in order to approximate it by the inverse model is also very small. It is therefore possible to limit oneself to the consideration of a finite subset, of small size, of the system of classes S whose cardinality is, in principle, infinite and countable.

It was shown above, with reference to FIGS. 5A-5D, that—for a given sensor—the more resolved the spatial occupancy grid, the closer to 0.5 is the maximum value of the inverse model. However, if one limits oneself to probability values belonging to a system of classes S, there exists a probability class $p_{min}$ which corresponds to the smallest value greater than 0.5. The optimal resolution of the occupancy grid is therefore that for which the maximum value of the inverse model is equal to $p_{min}$. Any subsequent decrease of the spacing of the grid increases the computational load without providing any gain in terms of information.

A system of classes $G_p^{P(o)}$ appropriate to the implementation of the invention can be defined by recurrence.

Let p be an occupancy probability lying strictly between 0 and $1 - P(o)$. The series $p_n$ is then defined by recurrence in the following manner:

$$p_0 = P(o);$$
$$p_1 = p;$$
$$p_{n+1} = F(p_i, p) \; \forall \, n > 1$$
$$p_{-1} = \frac{P(o)^2(1 - p)}{P(o)^2 + (1 - 2P(o))p};$$
$$p_{n-1} = F(p_n, p_{-1}) \; \forall \, i < -1 \qquad (15)$$

where F is the fusion function defined by equation (14).

In the case where the a priori occupancy probability is not the same for all the cells, the system (15) can be generalized without difficulty:

$$p_0 = P(o_i);$$

$$p_1 = p;$$

$$p_{n+1} = F(p_n, p) \; \forall \; i > 1$$

$$p_{-1} = \frac{P(o_i)^2(1-p)}{P(o_i)^2 + (1-2P(o_i))p};$$

$$p_{n-1} = F(p_n, p_{-1}) \; \forall \; i < -1 \quad \text{(15bis)}$$

F then being defined by equation (14bis).

Moreover the parameter "p", which fixes the value of $p_1$, can also be different from one cell to another.

By construction, these classes are error-free. Indeed, if $f_p$ denotes the function in one variable which, with a probability x, associates $f_p(x)=F(x,p)$, it is immediately seen that $\forall n \in \mathbb{N}^*$, $p_n=f_p{}^n(p)$, where the exponent "n" signifies "composed n times with itself". Consequently:

$$F(p_n, p_m) = F(f_p{}^n(p), f_p{}^m(p)) = f_p{}^{n+m}(p) = p_{n+m} \quad (16)$$

The fusion formula for these classes is extremely simple:

$$F_d(n,m) = n+m \; \forall n,m \in \mathbb{Z} \quad (17)$$

Moreover, the parameter p makes it possible to finely control the error introduced by the quantization; indeed if we put p=½+ε, we have:

$$E(p) = p_1 - p_0 = \varepsilon \quad (18)$$

This system of classes $G_p{}^{P(o)}$ is therefore very interesting since it makes it possible to carry out the whole fusion in the simplest possible manner (an integer addition) and error-free, and to curb the error introduced by the quantization by the choice of the parameter p.

Figure 6A:
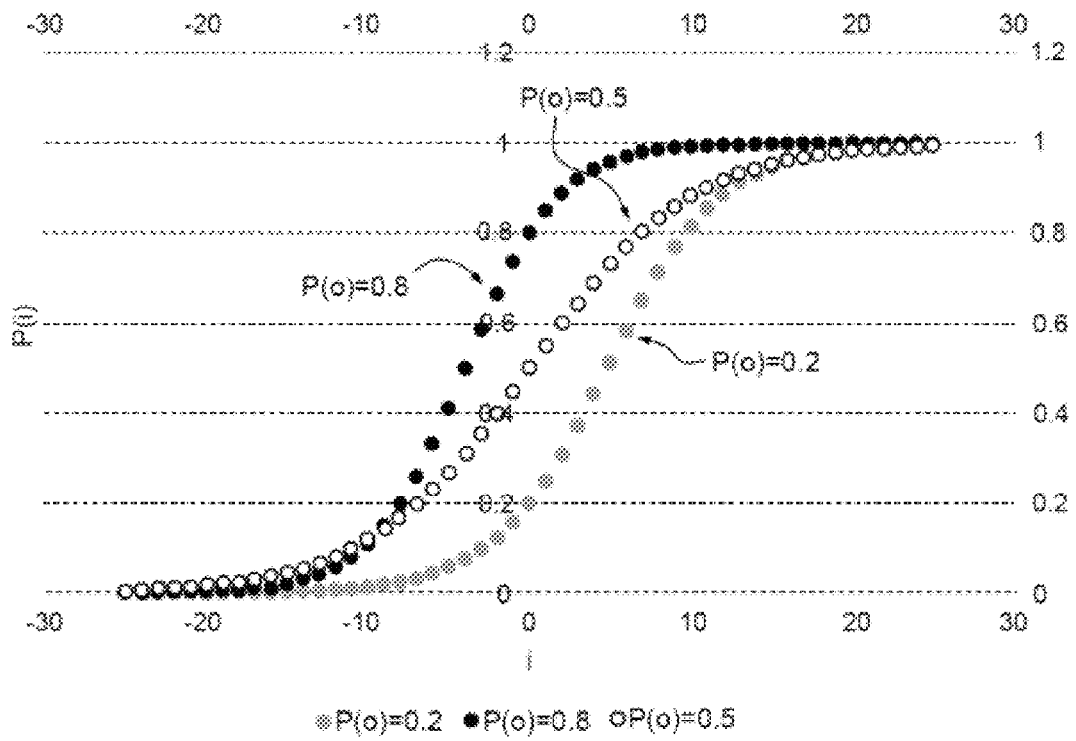
FIGS. 6A and 6B, diverse systems of probability classes.
Figure 6B:
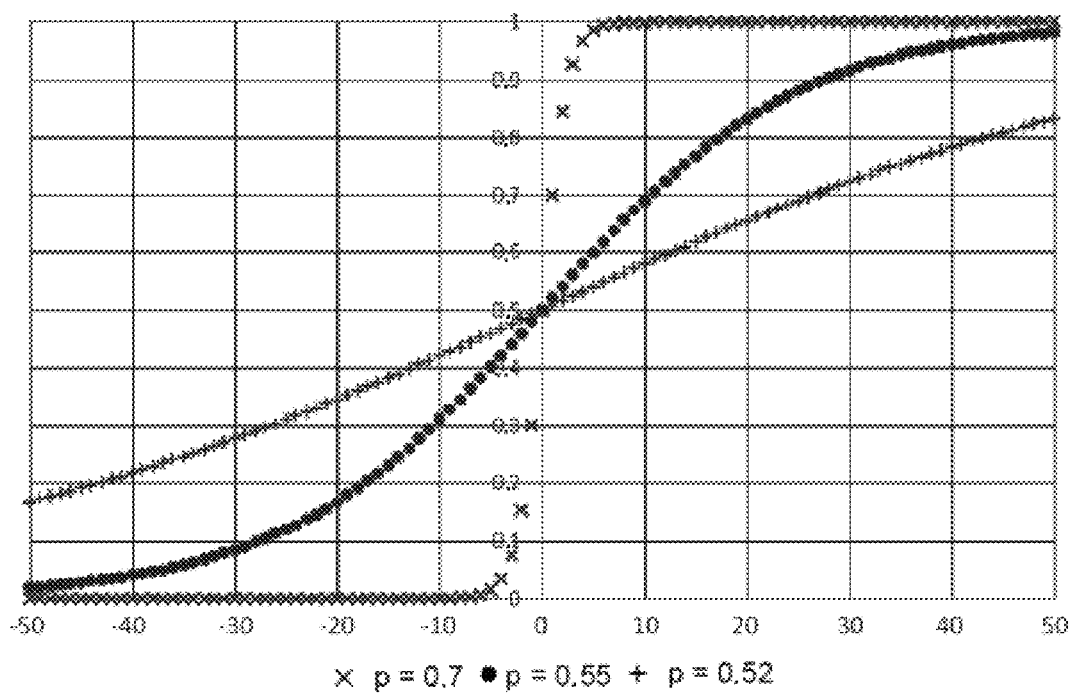

FIG. 6A illustrates the system of probability classes $G_p{}^{P(o)}$ for three values of the a priori probability (considered constant for all the cells): P(o)=0.2—corresponding, for example, in the case of an automobile application, to a situation of fairly light traffic flow; P(o)=0.5—corresponding to a situation of average, or unknown, intensity of traffic flow; P(o)=0.8—corresponding to a situation of heavy traffic flow. FIG. 6B illustrates the system of classes $G_p{}^{P(o)}$ with P(o)=0.5 for three values of the parameter p: 0.52; 0.55 and 0.7.

The system of classes $G_p{}^{P(o)}$ can also be defined in a direct (non-recursive) manner:

$$p_i = \frac{e^{L_i}}{1+e^{L_i}}, \; i \in \mathbb{Z} \quad (19)$$

where $$L_i = i \cdot \left(\log\left(\frac{p}{p-1}\right) - \log\left(\frac{P(o)}{1-P(o)}\right)\right) + \log\left(\frac{P(o)}{1-P(o)}\right) \quad (20)$$

Figure 7A:
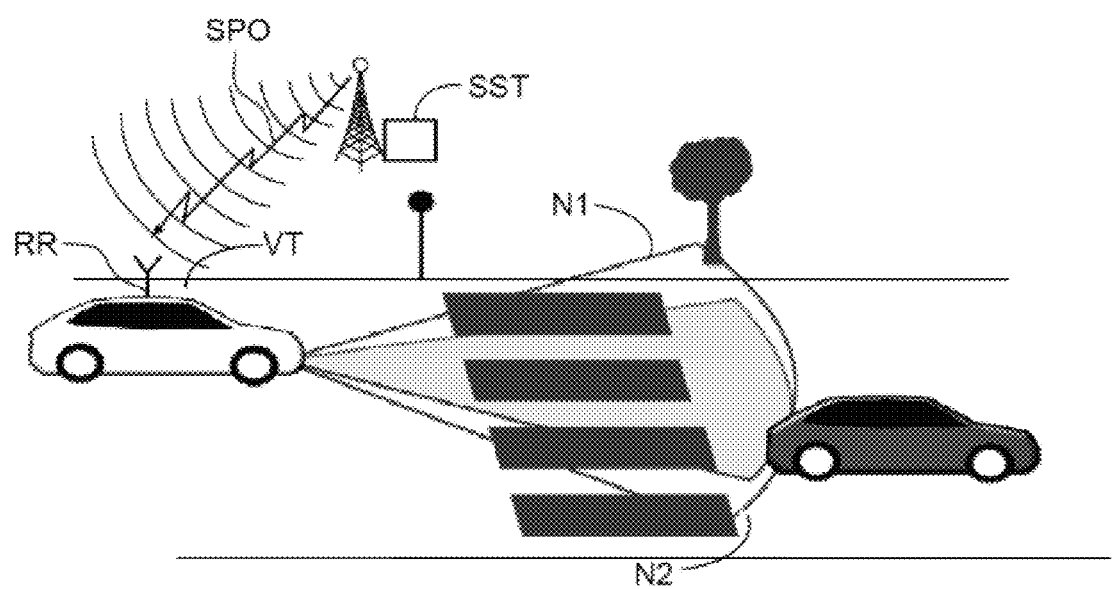
FIGS. 7A and 7B, a system for perceiving obstacles according to two variants of a first embodiment of the invention.

FIG. 7A illustrates the application of the invention to a terrestrial vehicle VT equipped with a distance sensor C, for example a mechanical-scanning laser telemeter (LIDAR). This sensor is configured to perform a plurality of one-dimensional scans of the space in front of the vehicle, each scan defining an acquisition "sheet". Preferably, a plurality of sheets N1, N2 . . . is produced, at different heights. During each scan, the sensor produces a vector of measurements z, each measurement of which is indicative of the presence of an obstacle—pedestrian, other vehicle, tree on the edge of the road . . . —in a respective direction and of its distance (for example, when z takes its maximum value, this signifies that there is no obstacle detected within the sensor's range limit). As a variant, a plurality of co-located sensors (that is to say having the same origin point for the distance measurement) can make it possible to produce a plurality of acquisition sheets simultaneously.

The vehicle VT is also equipped with a radio receiver RR which receives a signal SPO allowing it to determine the a priori occupancy probability value, P(o). The signal SPO is transmitted by a monitoring station SST which can be a traffic control center or even an autonomous item of equipment of the road infrastructure. This signal can directly convey the value of P(o), or else a parameter representative of a state of the traffic flow allowing a processor embedded on board the vehicle to compute this value.

Figure 7B:
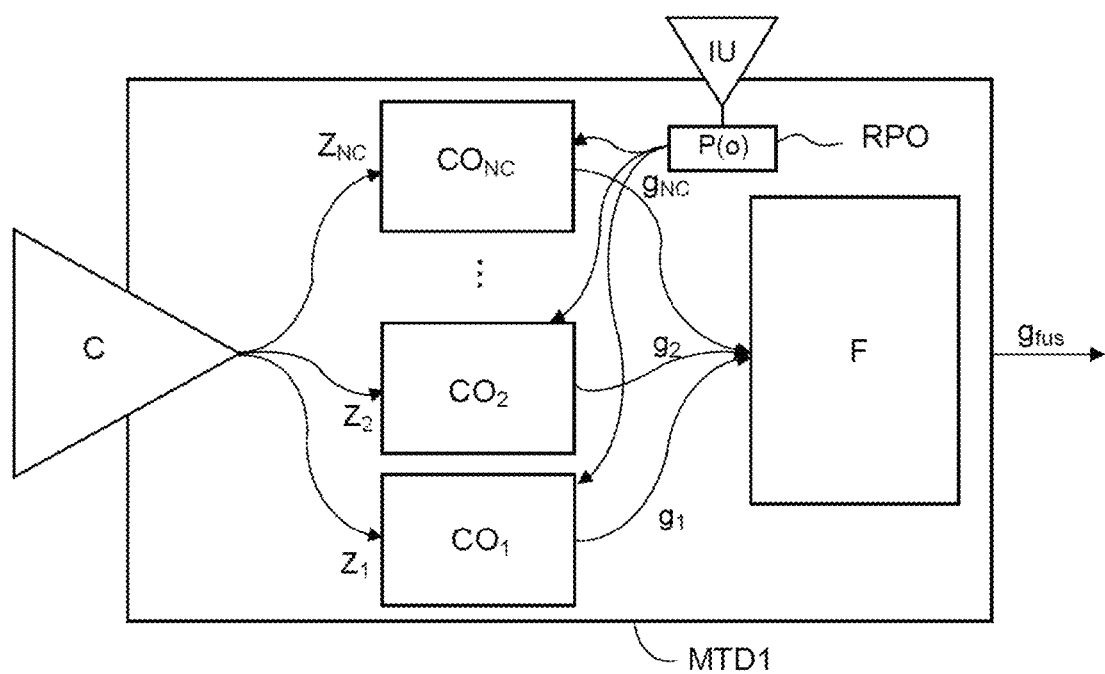

FIG. 7B illustrates a system for perceiving obstacles which is suitable for this application. This system comprises said sensor C (or a set of colocated sensors) and a data processing module MTD1 receiving as input the vectors of measurements corresponding to each acquisition sheet of the sensor and delivering at its output a signal (typically a vector of integers) representative of an occupancy grid obtained by fusing the data of these acquisition sheets.

In the embodiment of FIG. 7B, the data processing module MTD1 comprises a plurality of hardware blocks for computing occupancy probabilities, $CO_1 \ldots CO_{NC}$ and a hardware block for so-called consolidation or fusion computation F. Each block for computing occupancy probabilities $CO_k$ comprises a memory storing, in the form of a correspondence table, an inverse model of the sheet of index k of the sensor C, discretized by means of a system of probability classes, for example $S_1$. One speaks here of "inverse model of the sheet" since it is the measurements of the various sheets that are fused. If just one sensor is used to acquire several sheets, this single sensor is in fact equivalent to a plurality of sensors each acquiring a sheet, and each having its own inverse model (even if all these inverse models may be identical).

The data processing module also comprises a register RPO making it possible to store a value P(o) of the a posteriori occupancy probability. In contradistinction to the embodiment of FIG. 7A, in this case this value is chosen by a user by way of a user interface IU. The interface IU may for example be the control panel of an onboard computer, also making it possible to adjust the car radio, to parametrize the navigator, etc. For ergonomic reasons, it is preferable that the user need not input a numerical value; he might for example have to choose between a finite number of traffic flow state, or to position a cursor on a bar.

Each processing block $CO_k$ therefore receives as input the measurements corresponding to a respective acquisition sheet $z_k$ (references $z_1 \ldots z_{NC}$) as well as the value P(o) stored in the register RPO, and delivers as output an occupancy grid, in the form of a vector of integers $g_k$ representing the indices of the probability classes associated with the various cells of the grid. Thus, the grid $g_k$ encloses the occupancy information estimated with the aid of the measurements of the sheet k alone, that is to say of the vector of measurements $z_k$.

The consolidation hardware block F is a very simple arithmetic circuit, which implements equation (17). It receives at its input the occupancy grids $g_1 \ldots g_{NC}$ and delivers at its output a "consolidated" occupancy grid, represented in its turn by a vector of integers, indices of the probability classes associated with the various cells of this consolidated grid.

If the inverse models associated with the various acquisition sheets are identical, the blocks $CO_1 \ldots CO_{NC}$ are also identical, and can be replaced with a single hardware block for computing occupancy probabilities, performing the processings in a sequential manner.

The data processing module MTD1 can also be associated with distance sensors of any other type.

Figure 8A:
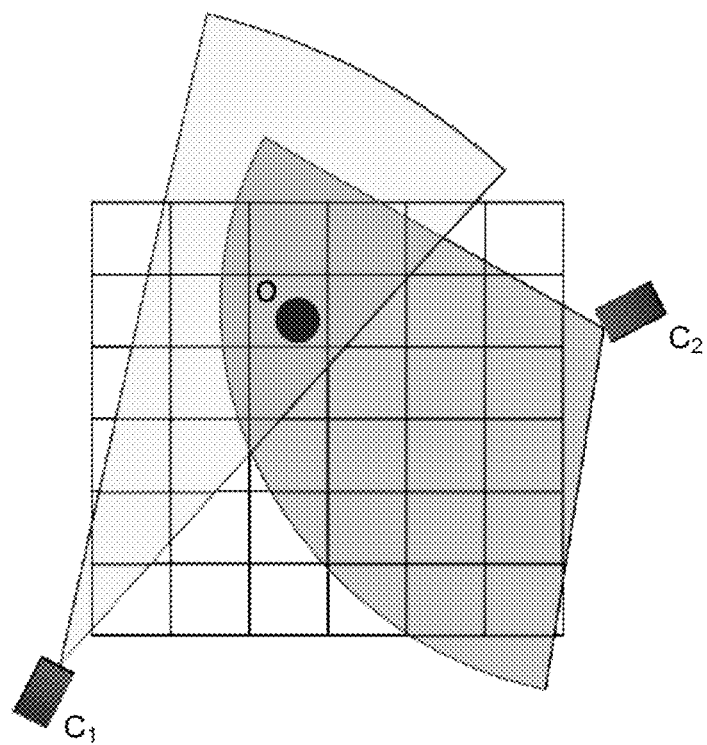
FIGS. 8A and 8B, a system for perceiving obstacles according to a second embodiment of the invention.
Figure 8B:
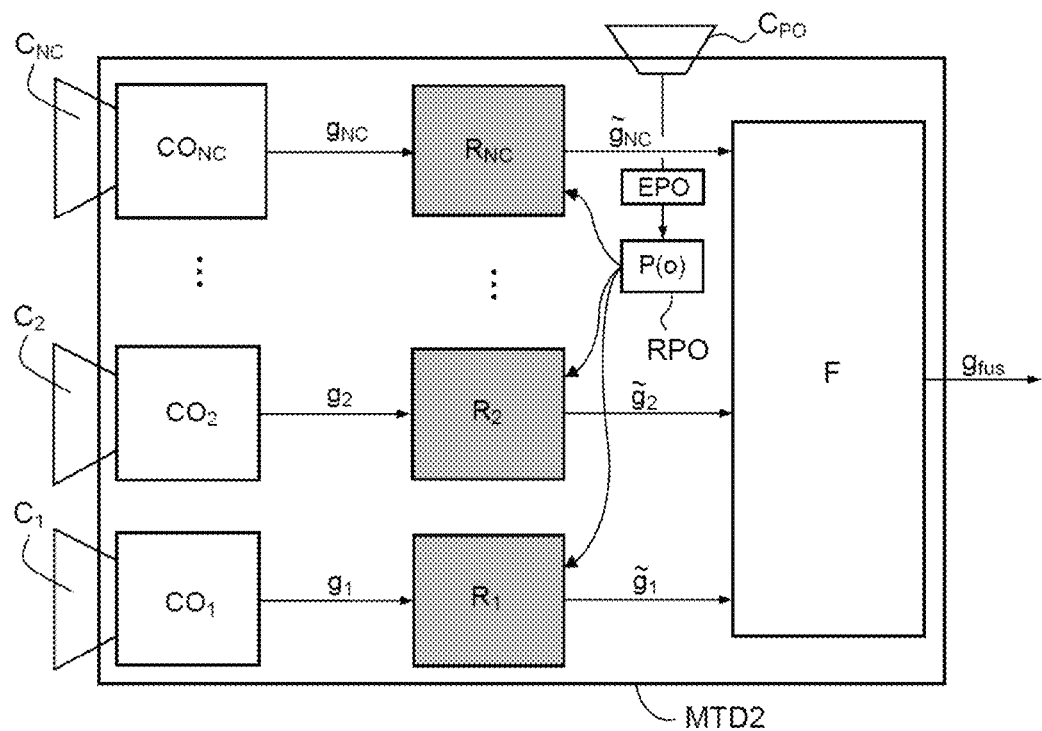

FIGS. 8A and 8B pertain to another embodiment of the invention, using several sensors disposed at different locations which cooperate to provide an occupancy grid constructed with the aid of measurements performed from various viewpoints. The sensors can be technologically heterogeneous, in terms of precision, range, field of vision and/or speed of acquisition. In this embodiment the distance of the first obstacle is an item of information relating to the sensor which makes the measurement. A schematic example of the scenario is represented in FIG. 8A, showing two sensors C1 and C2 placed at various positions and having different ranges and fields of vision. Thus the obstacle O is seen at completely different distances by C1 and C2.

In this embodiment, the main difficulty resides in the fact that the occupancy grid on the one hand and the sensors on the other hand each have their own inherent frame associated therewith. Thus, the evaluation of the location of the obstacles makes it necessary to perform changes of frame.

FIG. 8B illustrates a system for perceiving obstacles according to such an embodiment of the invention. This system comprises, in general, "NC" non-co-located and potentially heterogeneous sensors $C_1, C_2 \ldots C_{NC}$ and a data processing module MTD2. The latter differs from the data processing module MTD1 of FIG. 7B in that it also comprises, inserted between the hardware blocks for computing occupancy probabilities $CO_1 \ldots CO_{NC}$ and the consolidation hardware block F, change-of-frame blocks $R_1 \ldots R_{NC}$. Each of these blocks $R_k$ contains computation, generally floating-point, units for performing the change from the frame of a respective sensor to the frame of the so-called "consolidation" occupancy grid with respect to which the data fusion is performed. The computation performed for the change of frame consists in reassigning the occupancy of a location known in the frame of a sensor $C_k$ (expressed by a vector of integers $g_k$) to the corresponding cell in the frame of the consolidation grid. The vectors of integers representative of the occupancies of the cells of the consolidation grid are represented by $\tilde{g}_1 \ldots \tilde{g}_{NC}$. This reassignment assumes the computation of translations, rotations, etc. The processing of the blocks $R_k$ can for example be carried out using a floating arithmetic unit of an embedded processor (FPU: Floating Point Unit). In this case one and the same hardware block can perform the computation for the set of blocks $R_k$ (sequential processing).

As a variant, the equations for changing frame can be held in conversion tables stored in memories contained in the modules $R_k$. Thus, even in this case, it is possible to circumvent the floating-point computation and only perform operations on integers. On the other hand, these conversion tables may be fairly voluminous and their storage may have a non-negligible cost in terms of silicon surface area.

Furthermore, in contradistinction to the two previous embodiments, the value of the a priori occupancy probability P(o) is computed by a processor EPO on the basis of the data arising from a sensor $C_{PO}$ separate from the sensors $C_1$-$C_{NC}$ providing the measurements z. This may be for example a non-directional radar, emitting an electromagnetic pulse and counting the number of echoes received. The bigger this number, the higher the value of P(o) will be.

Figure 9:
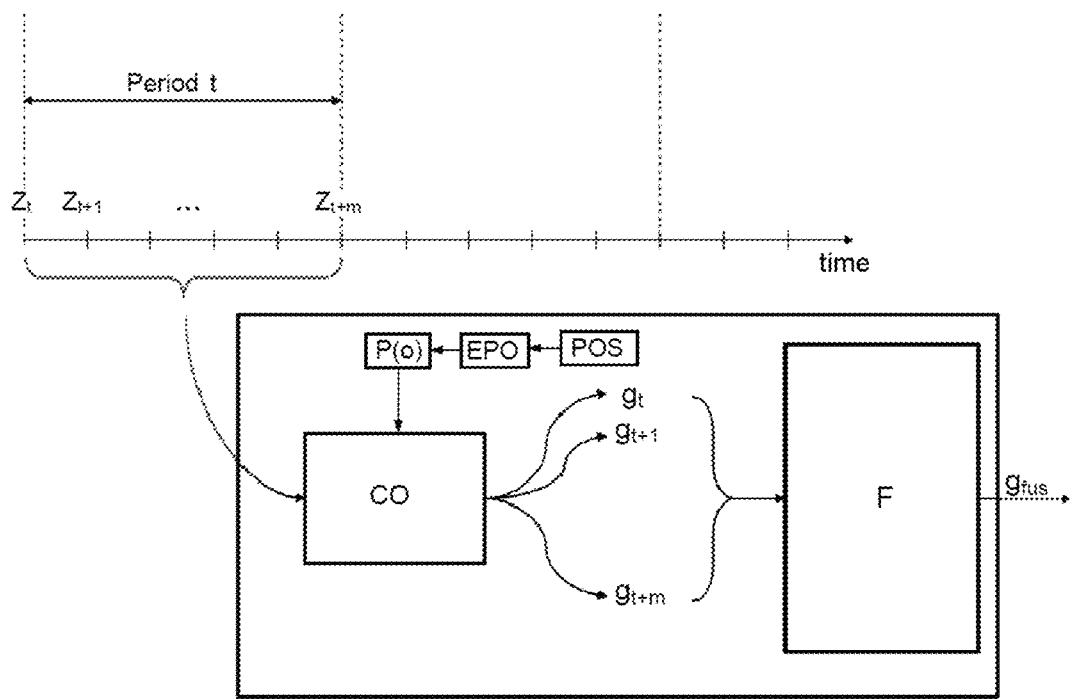
FIG. 9, a system for perceiving obstacles according to a third embodiment of the invention.

FIG. 9 illustrates a third embodiment of the invention in which a single sensor C, not represented, acquires scalar or vector measurements $z_t, z_{t+1}, \ldots z_{t+m} \ldots$ at an acquisition rate N times higher than is required for a determined application. A hardware block for computing occupancy probabilities CO produces an occupancy grid $g_t, g_{t+1}, \ldots g_{t+m} \ldots$ for each of these measurements. Next, a hardware fusion block F fuses N of these grids, acquired at successive instants, into a single consolidated grid $g_{fus}$; the consolidated occupancy grids $g_{fus}$ are therefore generated at a rate N times lower than the sensor application rate. For example, if the sensor C operates at a rate of 100 Hz and a rate of 10 Hz suffices for the envisaged application, it is possible to fuse 10 successive acquisitions.

In this embodiment, the processor EPO computes the value of a priori occupancy probability P(o) as a function of the spatio-temporal positioning of the sensor, that is to say of its position and/or of the time of day. These data are provided by a positioning device POS, such as a GPS receiver. As was explained above, the knowledge of the position and/or of the time makes it possible to estimate an expected traffic density, and therefore to choose an optimal value of P(o).

More generally, the signal received from outside may be indicative of a density of physical bodies in a region of observation of the sensor or sensors (for example, it may be a traffic density level, received directly or estimated on the basis of the spatio-temporal positioning of the sensors or of their respective observation regions), and the a priori occupancy probabilities be computed on the basis of this density of physical bodies.

Various means for acquiring and/or computing the value of P(o) have been described with reference to various embodiments of the invention. However, each embodiment can use any of these means—or indeed several of them. It is even possible to envisage using different acquisition or computation means for the a priori occupancy probabilities of various cells of the grid. Furthermore, the means described do not in any way constitute an exhaustive list.

In the embodiments of FIGS. 7B, 8B and 9 we have considered the case where the processings—or at least some of them—are carried out by hardware computation blocks, that is to say dedicated digital circuits. However, the invention also lends itself to a totally or partially software implementation, in which the processings—or at least some of them—are carried out by an aptly programmed generic processor.

Systems of probability classes other than $G_p^{P(o)}$ can be used for the implementation of the invention. In particular, it is not essential that the system of classes depends on the a priori probability P(o) or P($o_i$).

The invention claimed is:

1. A method for perceiving physical bodies comprising the following steps, implemented by a computer or a dedicated digital electronic circuit (MTD1, MTD2):
   a) acquisition of a plurality of distance measurements ($z_1 \ldots z_{NC}$) of said physical bodies arising from one or more sensors ($C_1 \ldots C_{NC}$);
   b) acquisition from an outside device, or computation on the basis of at least one signal (SST) received from outside, of at least one value of a priori probability of occupancy of the cells of an occupancy grid;
   c) application, to each said distance measurement, of an inverse model of the corresponding sensor on said occupancy grid (GO) providing a discretized spatial representation of an environment of said sensor, so as to determine a probability of occupancy by a physical body of a set of cells of said occupancy grid, each said inverse sensor model being a discrete model, associating with each cell of the corresponding occupancy grid, and for each distance measurement, a probability class chosen inside one and the same predetermined set of finite cardinality, each said probability class being identified by an integer index; and d) construction of a consolidated occupancy grid each cell of which exhibits an occupancy probability computed by fusing the occupancy probabilities estimated during step c), the probability of occupancy of each cell of the consolidated occupancy grid being determined by means of integer-only computations performed on the indices of the probability classes determined during said step c), and as a function of said or of a said a priori occupancy probability.

2. The method as claimed in claim 1, wherein said step b) comprises the acquisition of said or of at least one said value of a priori occupancy probability by way of a user interface device (IU).

3. The method as claimed in claim 1, wherein said step b) comprises the acquisition of said or of at least one said value of a priori occupancy probability by way of a radio receiver (RR).

4. The method as claimed in claim 3, wherein said or at least one said value of a priori occupancy probability, acquired by way of a radio receiver, is transmitted by a control station (SST).

5. The method as claimed in claim 1, wherein at least said sensors are on board a terrestrial vehicle, and said or at least one said value of a priori occupancy probability, transmitted by a control station, is dependent on a density of traffic flow on at least one road axis on which said terrestrial vehicle travels.

6. The method as claimed in claim 1, wherein said step b) comprises the reception of a said signal (SST) received from outside indicative of a density of physical bodies in a region of observation of said or of at least one said sensor, and the computation of said or of at least one said value of a priori occupancy probability on the basis of said density of physical bodies.

7. The method as claimed in claim 1, wherein said step b) comprises the computation of said or of at least one said value of a priori occupancy probability on the basis of at least one signal of presence of said physical bodies arising from one or more sensors ($C_{PO}$) other than the sensors used to implement said step a).

8. The method as claimed in claim 1, wherein said set of finite cardinality is formed by the union of one or more subsets such that, during said step d), the fusion of two probability classes belonging to one and the same subset provides a result also belonging to said subset.

9. The method as claimed in claim 1, wherein said set of finite cardinality constitutes a nonuniform discretization of the probability interval [0, 1], with a discretization spacing increasing between 0 and 0.5, and then decreasing between 0.5 and 1.

10. The method as claimed in claim 9, wherein said set of finite cardinality, designated by $G_p^{P(o)}$, is defined by: $G_p^{P(o)} = \{(p_n), n \in \mathbb{Z}\}$, $\mathbb{Z}$ being the set of relative integers, the probability classes $p_n$ being defined in the following manner:

$$p_0 = P(o_i);$$

$$p_1 = p;$$

$$p_{n+1} = F(p_n, p) \; \forall \, n > 1$$

$$p_{-1} = \frac{P(o)^2(1-p)}{P(o)^2 + (1 - 2P(o))p};$$

$$p_{n-1} = F(p_n, p_{-1}) \; \forall \, i < -1$$

where $P(o_i)$ is the value of a priori probability of occupancy of the cell of index "i" of the occupancy grid, p a parameter of value lying strictly between 0 and $1-P(o_i)$ and F an occupancy probability fusion function; and in which, during said step d), the fusion between two probability classes $p_i$, $p_j \in G_p^{P(o)}$ is computed by applying the following equation: $F(p_n, p_m) = p_{n+m}$.

11. The method as claimed in claim 1, wherein said step d) comprises the implementation of changes of frame so as to construct said consolidated occupancy grid on the basis of occupancy probabilities of cells of occupancy grids associated with non-co-located sensors.

12. The method as claimed in claim 1, also comprising a preliminary step of constructing the inverse models of at least one said sensor on the corresponding occupancy grid, implemented by applying the following equation:

$$P(o_i \mid z) = \frac{p(z \mid o_i) P(o_i)}{p(z \mid o_i) P(o_i) + p(z \mid v_i)[1 - P(o_i)]}$$

where:
$P(o_i|z)$ represents the probability of occupancy of the cell of index "i" of the occupancy grid, said cells being ordered by increasing distance of said sensor;
$P(o_i)$ is said value of a priori probability of occupancy of the cell of index "i" of the occupancy grid;
$p(z|o_i)$ is the probability density of the measurement "z" provided by the sensor when the cell of index "i" of the occupancy grid is occupied, a function of $P(o_i)$ and of the direct model of the sensor; and
$p(z|v_i)$ is the probability density of the measurement "z" provided by the sensor when the cell of index "i" of the occupancy grid is vacant, a function of $P(o_i)$ and of the direct model of the sensor.

13. The method as claimed in claim 1, wherein the a priori occupancy probability is the same for all the cells of the occupancy grid.

14. A system for perceiving physical bodies comprising:
at least one first input port for receiving a plurality of signals ($z_1$, ..., $z_{NC}$) representative of distance measurements of said physical bodies arising from one or more sensors;
at least one second input port for receiving a signal representative of at least one value of a priori probability of occupancy of the cells of an occupancy grid, or allowing its computation;
a data processing module (MTD1, MTD2) configured to receive as input said signals and to use them to construct a consolidated occupancy grid by applying the method of claim 1; and
at least one output port for a signal ($g_{fus}$) representative of said consolidated occupancy grid.

15. The system as claimed in claim 14, also comprising a user interface device (IU) linked to said second input port and adapted to allow a user to choose said or at least one said value of a priori occupancy probability.

16. The system as claimed in claim 14, also comprising a radio receiver (RR) linked to said second input port and adapted to receive a radio signal (SPO) representative of said or of at least one said value of a priori occupancy probability.

17. The system as claimed in claim 14, also comprising a spatial or spatio-temporal positioning system (POS) linked to said second input port and adapted to generate a positioning item of information, said data processing module being adapted to compute said or at least one said value of a priori occupancy probability on the basis of said positioning item of information.

18. The system as claimed in claim 14, also comprising one or more sensors ($C_{PO}$) linked to said second input port and adapted to generate a signal of presence of said physical bodies.

19. The system as claimed in claim 14, also comprising one or more distance sensors ($C_1, \ldots, C_{NC}$) adapted to generate signals representative of a plurality of distance measurements of said physical bodies and linked to said input port or ports.

20. The system as claimed in claim 14, wherein said data processing module comprises at least one hardware block for computing occupancy probabilities ($CO_1 \ldots CO_{NC}$) comprising a memory storing, in the form of a correspondence table, an inverse model of a sensor associating with each distance measurement a vector of integers representing indices of probability classes associated with respective cells of an occupancy grid.

21. The system as claimed in claim 14, wherein said data processing module comprises a hardware block for, so-called consolidation, integer computation (F), configured to receive as input a plurality of integers representing indices of probability classes associated with cells of respective occupancy grids, and to compute an index of a probability class associated with a cell of said consolidated occupancy grid.

\* \* \* \* \*